M. B. RAY & E. K. HENDERSON.
RESILIENT WHEEL.
APPLICATION FILED JUNE 25, 1913.
1,077,430.
Patented Nov. 4, 1913.
2 SHEETS—SHEET 1.
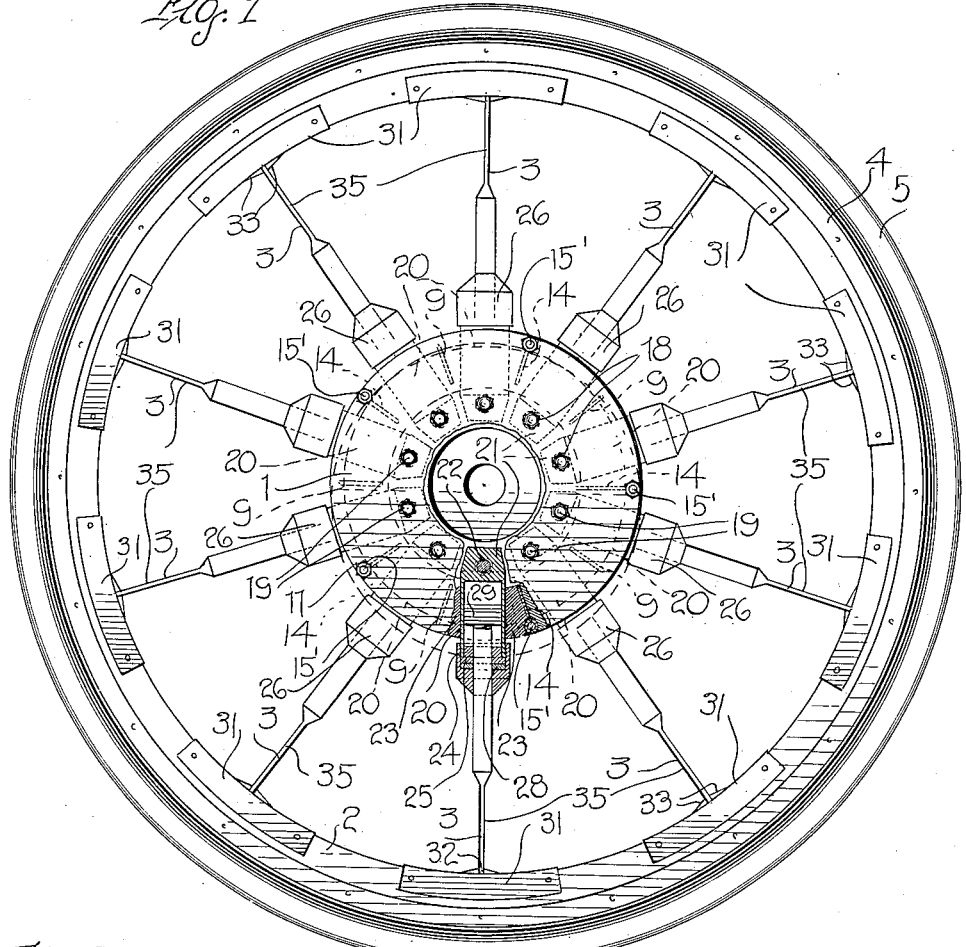
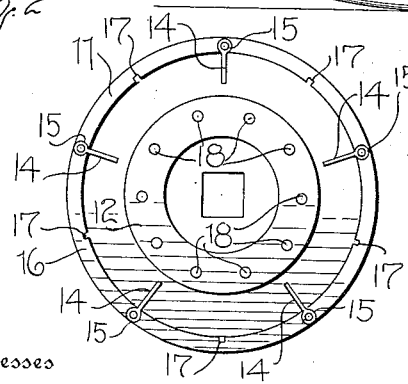
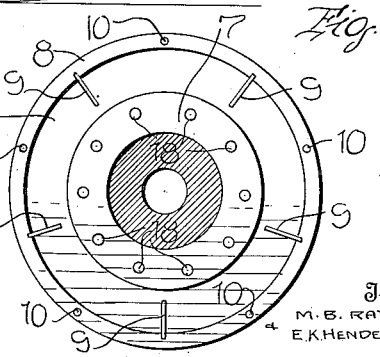
Witnesses
Robert M. Sutphen
A. I. Hind
Inventors
M. B. Ray
E. K. Henderson
By Watson E. Coleman
Attorney

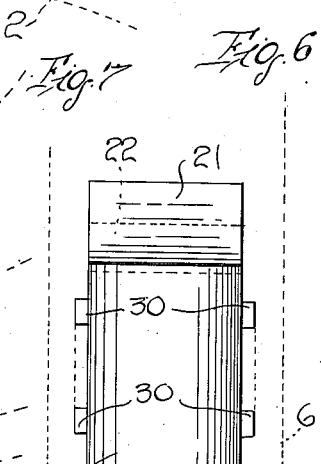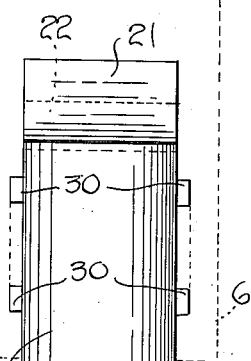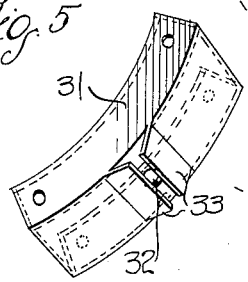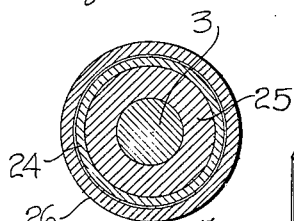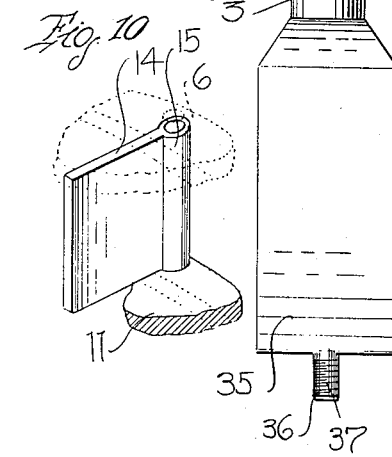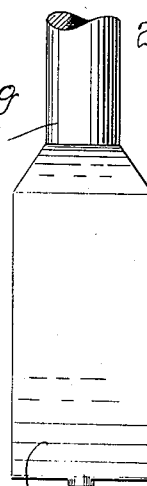

UNITED STATES PATENT OFFICE.

MADISON B. RAY AND EDWARD K. HENDERSON, OF NEDERLAND, COLORADO.

RESILIENT WHEEL.

1,077,430.  Specification of Letters Patent.  Patented Nov. 4, 1913.

Application filed June 25, 1913. Serial No. 775,747.

*To all whom it may concern:*

Be it known that we, MADISON B. RAY and EDWARD K. HENDERSON, citizens of the United States, residing at Nederland, in the county of Boulder and State of Colorado, have invented certain new and useful Improvements in Resilient Wheels, of which the following is a specification, reference being had to the accompanying drawings.

This invention relates to improvements in vehicle wheels, and more particularly to that class of wheels which are formed with pneumatic cushions.

An object of this invention is the provision of a resilient wheel, the hub of which is provided with a plurality of radially extending cylinders, the rim having a plurality of inwardly extending spokes connected thereto, the inner ends of the spokes having pistons mounted thereon for slidable engagement within the cylinders, whereby a plurality of pneumatic cushions are provided.

A still further object of this invention is the provision of a resilient wheel comprising a hub and a rim, the hub having a plurality of radially extending air tight cylinders pivotally connected thereto, the rim having a plurality of inwardly extending spokes having pistons mounted on their inner ends for slidable engagement within the cylinders, the pistons being normally disposed centrally in the cylinders whereby pressure spaces are provided in each cylinder on the opposite sides of the pistons.

With these and other objects in view, this invention consists in the novel construction, combination and arrangement of parts to be hereinafter more fully described, claimed and illustrated in the accompanying drawings, in which—

Figure 1 is a side elevation of our improved wheel, partly in section; Fig. 2 is an inner face elevation of the removable side plate of the hub; Fig. 3 is a transverse section of the hub showing the inner face of the integral side plate thereof; Fig. 4 is a longitudinal section of one of the keeper plates showing one of the spokes connected thereto; Fig. 5 is a perspective view of one of the keeper plates; Fig. 6 is a side elevation of one of the cylinders showing a spoke connected thereto. Fig. 7 is a longitudinal section of one of the cylinders showing a spoke connected thereto; Fig. 8 is a section on the line 8—8 of Fig. 6; Fig. 9 is a fragmentary elevation of one of the spokes; and Fig. 10 is a detail perspective view showing one of the flanges on the detachable side plate of the hub.

Referring more particularly to the drawings, the numeral 1 designates the hub of the wheel, 2 the felly, and 3 the spokes connecting the hub and the felly. A rim 4 is mounted upon the outer face of the felly, the rim having a solid rubber tire 5 mounted thereon in any desired manner. The hub 1 is formed at its inner edge with a preferably integral annular side plate 6, the plate having an annular inner ring 7 formed thereon adjacent the periphery of the hub, and an outer annular ring 8 at its outer edge. The plate 6 is provided on its inner face at intervals with inwardly extending flanges 9, and the ring 8 has openings 10 formed therein between the flanges 9. An outer side plate 11 is disposed upon the opposite edge of the hub, the plate 11 being also formed with an inner ring 12 which forms a seat 13 in the plate inwardly of the ring for the reception of the outer end of the hub. The plate 11 is also formed with inwardly extending flanges 14, the outer edges of the flanges 14 being tubular as at 15 for registration with the openings 10 in the outer ring 8 of the inner side plate 6 and for the reception of bolts 15′. The plate 11 is provided with an outer annular ring 16, the ring being provided with a plurality of spaced notches 17 which form seats for the reception of the outer edges of the flanges 9 of the side plate 6. Each of the inner rings 7 and 12 of the plates 6 and 11 respectively are formed with a plurality of openings 18, the plates being connected together by bolts 19 which are passed through the openings in the inner rings.

A plurality of cylinders 20 are disposed between the plates 6 and 11, each of the cylinders having a tapered extension 21 on its inner end which is provided with an opening 22, whereby the cylinders may be mounted upon the connecting bolts 19. From the drawings, it will be seen that each of the cylinders 20 is disposed between one of the flanges 9 of the plate 6 and one of the flanges 14 of the plate 11, and disposed between the flanges and the cylinders are resilient blocks 23 the blocks being maintained in position between the plates by the outer rings 8 and 16 of the plates. The outer ends of the cylinders 20 project outwardly of the side plates of the hub, and are threaded exteriorly as at 24, glands 25 being mounted in the outer ends of the cylinders, the glands being held within the cylinders by the gland caps 26 which are threadedly connected to the outer ends of the cylinders. The glands 25 are preferably formed with shoulders 27 to prevent inward movement thereof within the cylinders, and if desired gaskets 28 may be disposed between the inner faces of the gland caps and the outer faces of the glands to provide tight joints between them and the inner ends of the spokes 3, the inner ends of which are disposed within the cylinders. The inner ends of the spokes 3 are preferably tubular in form and connected to the inner extremity of each spoke is a piston 29, the pistons being adapted for reciprocation within the cylinders, and the pistons being disposed centrally in the cylinders thereby providing pressure spaces within the cylinders upon the opposite sides of the pistons. Each of the cylinders 20 is provided on its opposite faces with bearings 30 which rest against the inner and outer rings of the side plates to relieve the bolts 19 from strain resultant from twisting on the rim of the wheel.

The felly 2 has connected thereto a plurality of keepers 31, each of which are provided with a central opening 32 and are further provided upon their inner faces with the downwardly projecting opposed brace members 33. The outer ends of the spokes 3 are preferably flattened, as at 35, the flattened portions of the spokes having outwardly projecting circular extensions 36, which are threaded, as at 37. The extensions 36 of the spokes are passed through the openings 32 in the keepers and the outer edges of the flattened portions 35 of the spokes are disposed between the brace members 33 whereby the spokes will be securely held against any turning movement whatever. Nuts 38 are threaded upon the threaded portions 37 of the extensions 36 which are disposed within the outwardly bent portions 33 of the keepers, whereby the spokes are maintained in connection with the felly of the wheel. The spokes are preferably composed of spring metal, so that the flat portions thereof and the cushioning blocks 23 between the cylinders 20 and the flanges of the side plates resist the twisting strain of the rim and felly with relation to the hub of the wheel.

In the practical use of our device, it will be seen that the lateral strain imposed upon the wheel will be absorbed by the pneumatic cushions formed by the cylinders within which the pistons on the iner ends of the spokes reciprocate, and circumferential strain imposed upon the wheel is absorbed by the cushioning blocks disposed between the cylinders and the resilient quality of the spokes. It will be seen that the wheel may be readily taken apart by removing the bolts 19, whereupon the side plate 11 may be removed, so that the hub 1 and the side plate 6 may be disengaged from the cylinders 20 so that any of the cylinders and pistons may be replaced if necessary.

What we claim is:—

1. A resilient wheel including a hub, radially extending cylinders pivotally connected to said hub, a rim, keepers secured at intervals to said rim, said keepers being provided with centrally arranged openings, downwardly projecting opposed brace members formed integral with said keepers and arranged upon opposite sides of the opening, spokes, the outer portions of said spokes being flattened for engagement by the brace members, a circular threaded extension formed on said spokes and disposed within said openings, and pistons connected to the other ends of said spokes for reciprocation within said cylinders, as and for the purpose specified.

2. A wheel comprising a hub, a rim, side plates extending outwardly from said hub, radially projecting cylinders pivotally connected to the hub between said plates, said plates being formed with inwardly extending flanges and said cylinders being disposed between said flanges, cushioning blocks arranged between the cylinders and flanges, keepers secured at intervals to said rim, said keepers being provided with centrally arranged openings, downwardly projecting opposed brace members formed integral with said keepers and arranged upon opposite sides of the openings, spokes, the outer portions of said spokes being flattened for engagement by the brace members, a circular threaded extension formed on said spokes and disposed within said openings, and pistons connected to the other ends of said spokes for reciprocation within said cylinders.

In testimony whereof we hereunto affix our signatures in the presence of two witnesses.

MADISON B. RAY.
EDWARD K. HENDERSON.

Witnesses:
RANDALL C. CRONIN,
GEO. F. BAKER.